United States Patent [19]

Yamamura et al.

[11] 4,349,455

[45] Sep. 14, 1982

[54] EMULSIFICATION PROCESS

[75] Inventors: Nobuo Yamamura; Motoaki Takeda, both of Minami-ashigara, Japan

[73] Assignee: Fuji Photo Film Co., Ltd., Kanagawa, Japan

[21] Appl. No.: 134,618

[22] Filed: Mar. 27, 1980

[30] Foreign Application Priority Data

Mar. 27, 1979 [JP] Japan .................................. 54-36045

[51] Int. Cl.$^3$ .............................................. B01J 13/00

[52] U.S. Cl. .................................... 252/312; 252/314; 252/359 C; 252/359 D; 430/377

[58] Field of Search ........................ 252/316, 312, 314; 430/377

[56] References Cited

U.S. PATENT DOCUMENTS

| | | | |
|---|---|---|---|
| 2,311,020 | 2/1943 | Bennett, Jr. et al. | 252/314 X |
| 2,665,206 | 1/1954 | Bradley | 252/312 X |
| 3,212,896 | 10/1965 | Yudelson et al. | 252/316 X |
| 3,669,899 | 6/1972 | Vassiliades et al. | 252/316 |

*Primary Examiner*—Richard D. Lovering
*Attorney, Agent, or Firm*—Sughrue, Mion, Zinn, Macpeak & Seas

[57] ABSTRACT

A process for emulsification which comprises producing an oily phase solution of a hydrophobic material in a dissolving-emulsifying tank equipped with a high speed dispersing means by stirring the hydrophobic material directly or dissolving the hydrophobic material or a hydrophobic material and an emulsifying agent in an organic solvent with heating, forming a water-in-oil emulsion by adding water or water and an emulsifying agent to said solution of the hydrophobic material with stirring, continuing the addition of water or water and the emulsifying agent to form an oil-in-water emulsion by phase inversion, adding a water-soluble binder to said oil-in-water emulsion and stirring the emulsion to form the desired oil-in-water emulsion.

5 Claims, 5 Drawing Figures

FIG 1A
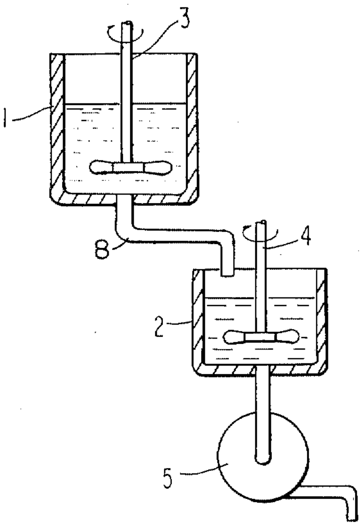
FIG 1B
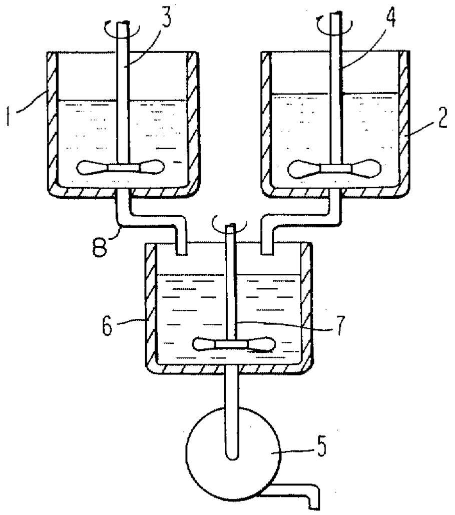
FIG 2
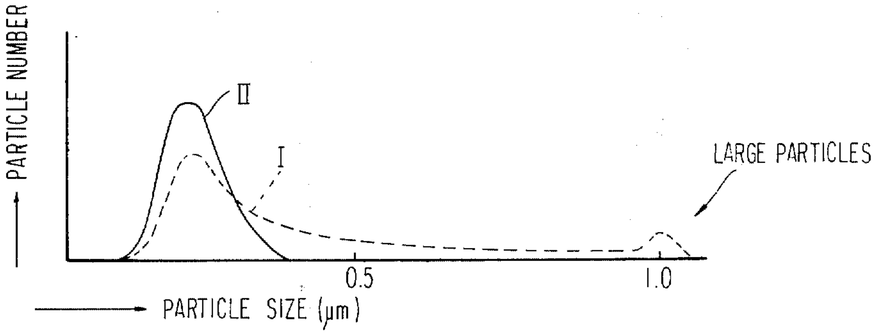
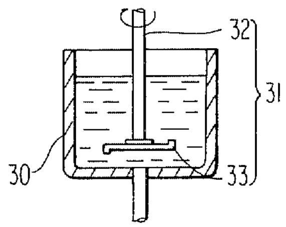
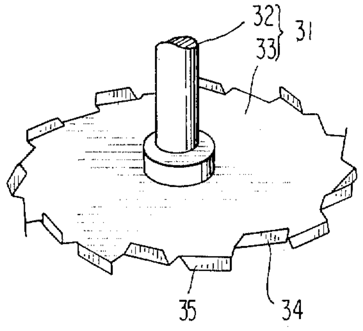
FIG 3
FIG 4

EMULSIFICATION PROCESS

BACKGROUND OF THE INVENTION

1. Field of the Invention

The present invention relates to a process for producing oil-in-water emulsions of hydrophobic materials.

2. Description of the Prior Art

Oil-in-water emulsions have been used in photosensitive materials, cosmetics, in making chemicals and pressure-sensitive recording materials, etc., in which the hydrophobic material is an active component. In the case of photographic materials, the hydrophobic materials are dye image forming compounds (herein couplers are used as a representative example), diffusion transfer or dye image forming compounds, anti color-fogging agents, antifading agents, antistaining agents, ultraviolet ray absorbing agents, whitening agents, etc.

In conventional processes for preparing oil-in-water emulsions for photosensitive materials and particularly silver halide photosensitive materials, a relatively small amount of an oily phase solution is added to a comparatively large amount of aqueous phase solution (containing binder) with stirring. If the hydrophobic material is liquid, the hydrophobic material is used as it is or as an oily phase solution wherein the hydrophobic material is mixed with an organic solvent, an emulsifying agent or a mixture of an organic solvent and an emulsifying agent. When the hydrophobic material is solid, the hydrophobic material is used as an oily phase solution wherein the hydrophobic material is dissolved in an organic solvent alone or a mixture of an organic solvent and an emulsifying agent. The resulting oily phase solution of the hydrophobic material is then added to and dispersed in an aqueous phase solution of a water-soluble binder with stirring. The aqueous phase solution of a water-soluble binder contains an emulsifying agent, if necessary. Thus, an oil-in-water emulsion having an average particle size of about 0.1 to 10 $\mu m$ is conventionally obtained.

Conventional processes for preparing oil-in-water emulsions for photographic sensitive materials have been carried out by means of an apparatus such as shown in FIGS. 1 (A) and 1 (B). In FIGS. 1 (A) and 1 (B), the coupler or the coupler and an emulsifying agent are first dissolved by mixing with an organic solvent in a first tank 1 equipped with a propeller stirrer 3 having a comparatively simple structure to produce an oily phase coupler solution. On the other hand, an aqueous solution of the hydrophilic colloid such as gelatin or gelatin and an emulsifying agent is prepared in a second tank 2 equipped with a propeller stirrer 4. Thereafter, the resulting coupler solution in the first tank 1 is added to the aqueous solution of gelatin in the second tank 2 [FIG. 1 (A)] or the coupler solution and the aqueous solution of gelatin are simultaneously poured into a third tank 6 equipped with a propeller stirrer 7 [FIG. 1 (B)] to produce an oil-in-water coupler emulsion. The resulting emulsion is then processed by an emulsifying machine 5 such as a colloidal mill, a homogenizer, a homomixer, etc., to make the particle size of the drops of the coupler solution a uniform suitable size. Thus, the emulsification process is accomplished.

By carrying out the aforementioned process, it is possible to disperse the couplers in the aqueous solution of gelatin (the continuous aqueous phase) to provide a particle size distribution such as shown by the dotted line for Curve I in FIG. 2. The average particle size of Curve I can be adjusted by selecting the type of the emulsifying machine or adjusting the number of times the emulsion is passed through the emulsifying machine.

The above-described emulsification procedure has the following drawbacks:

(1) Depending on the type of hydrophobic material which is dissolved in the drops of the oily phase solution it easily precipitates.

(2) It is difficult to prevent formation of large particles and to reduce the breadth of the particle size distribution range as shown in Curve I.

(3) The particle size sometimes grows when the oil-in-water emulsion is allowed to stand for a long period of time.

(4) It is very difficult to change average particle size as desired without changing the emulsifying machine that is used or the operating conditions.

(5) Since the coupler solution and the aqueous gelatin solution are each separately prepared in a first tank 1 and a second tank 2 and they are then mixed in a second tank 2 or a third tank 6, the coupler solution adheres to the walls of the first tank 1, the shaft or the propeller of the propeller stirrer 3, the inner wall of conduit 8 provided between the first tank 1 and the second tank 2, or the third tank 6 and, operation efficiency is not suitable because a long period of time is required for cleaning.

(6) Cleaning and adjustment of equipment such as the second tank 2 and the emulsifying machine 5, etc., sometimes takes much time and it is difficult to make up for the time loss, because the process comprises many steps.

SUMMARY OF THE INVENTION

An object of the present invention is to overcome the above-described disadvantages in the conventional process for emulsification and to provide a process for emulsification of the above-described oil-in-water emulsions, by which stabilized emulsions having a narrow particle size distribution are rapidly obtained by means of a very simple apparatus.

In contrast to conventional methods for preparing an oil-in-water emulsion, it has been discovered that by forming the emulsion by adding a relatively large amount of aqueous phase solution to a comparatively small amount of oily phase solution and thereby proceeding to an oil-in-water emulsion via phase inversion of a water-in-oil emulsion, and then adding water-soluble binder to the emulsion; the oil-in-water emulsion that is obtained has a narrow particle size distribution, does not contain large particles, and is stable over long periods of storage. Further the hydrophobic material does not precipitate.

Accordingly, the present invention provides an emulsification process which comprises producing an oily phase solution of a hydrophobic material in a dissolving-emulsifying tank equipped with a high speed dispersing means by strirring a hydrophobic material directly or a hydrophobic material or a hydrophobic material and an emulsifying agent in an organic solvent with heating; forming a water-in-oil emulsion by adding water or water and an emulsifying agent to the solution of the hydrophobic material with stirring; continuing the addition of water or water and the emulsifying agent to form an oil-in-water emulsion by phase inversion; adding a water-soluble binder to said oil-in-water emulsion and stirring the emulsion to obtain the desired oil-in-water emulsion.

BRIEF DESCRIPTION OF THE DRAWINGS

FIGS. 1 (A) and 1 (B) each illustrates apparatus used in the conventional emulsification process.

FIG. 2 is a graph of particle size distribution for an emulsion obtained by a conventional process and an emulsion obtained by the process of the present invention.

FIG. 3 illustrates apparatus used in the process of the present invention.

FIG. 4 is an enlargement of the impeller in FIG. 3.

DETAILED DESCRIPTION OF THE INVENTION

The process of the present invention is illustrated with reference to FIG. 3 which is a simplified apparatus for practicing the present invention.

The apparatus is constructed of a dissolving-emulsifying tank 30 (hereinafter simply "tank") and a dispersing means 31.

The dispersing means 31 such as shown in FIG. 3, commonly also referred to as a "dissolver", comprises a perpendicular axis 32 which revolves at a high rate in the center of the nearly cylindrical tank 30 and an impeller 33 having saw-shaped blades 34 and 35 which are alternately bent upwards and downwards as shown in FIG. 4. It is preferred that the inside diameter of the tank 30 is about 2.8 to 4.0 D, the space between the bottom of the tank 30 and the impeller 33 is about 0.5 to 1.0 D and the depth of a stationary solution in the tank 30 is about 1.0 to 3.0 D where D is the diameter of the impeller 33. Not only the above-described dispersing means 31 but also any dispersing apparatus such as a homomixer, a homoblender or a Kady mill, etc., may be used as a high speed dispersing means as long as the primary impeller revolves at a high rate in the liquid such as 500 rpm or more, e.g., 500 to 15,000 rpm and preferably 2,000 to 4,000 rpm.

Further, the above-described apparatus may be modified with means to reduce or increase pressure to control foaming. Axis 32 may also be equipped with a plurality of impellers 33 or propellers. As another embodiment the apparatus can be equipped with a plurality of impellers aligned in parallel or at various angles and the above-described tank 30 may be equipped with another stirrer or dispersing means such as a paddle type stirrer, a propeller type stirrer or a colloid mill, etc., together with dispersing means 31.

Using the apparatus for practicing the process of the present invention constructed as described above, the coupler (it is again noted that the coupler is used as representative of all hydrophobic photographic additives) or the coupler and an emulsifying agent are first dissolved in an organic solvent in the tank 30 by heating with stirring by means of the dispersing means 31 to produce an oily phase solution of the coupler. Subsequently, water or a mixture of water and an emulsifying agent such as sodium dodecylbenzenesulfonate is added to the solution of the coupler in the tank 30 and dispersed therein to temporarily form a water-in-oil emulsion.

With continued addition of water or water and the emulsifying agent, phase inversion occurs in the tank 30 to form an oil-in-water emulsion, as the coupler solution becomes the dispersed phase and the water becomes the continuous phase. Once this point is reached, a gelatin powder is added to the oil-in-water emulsion in the tank 30 and dissolved therein with mixing, the mixture is further stirred to obtain the desired oil-in-water emulsion. The gelatin may also be added as a solution which has been previously prepared in another tank if space permits.

The particle size of coupler drops in the emulsion obtained by the process of the present invention is uniform with a very narrow distribution as shown as Curve II represented by the solid line in FIG. 2.

Generally, the particle size of emulsions is adjusted by appropriately selecting the type and/or the amount of the emulsifying agent and/or the organic solvent added to the solution of the hydrophobic material; by appropriately selecting the kind and/or the amount of the emulsifying agent involved in the solution of the watersoluble binder; or by changing the operating conditions of the emulsifying apparatus. However, according to the process of the present invention, the average particle size of the emulsion can be suitably controlled by properly selecting the time of addition and the amount of water or water and emulsifying agent in the aqueous phase, or by selecting the time of addition and the amount of watersoluble binder, without changing the formulation of the emulsions or the operating conditions of the emulsifying machine, and it is possible to obtain an emulsion having a narrow distribution of particle size.

When water or water and an emulsifying agent are added to the solution of the hydrophobic material, a water-in-oil emulsion is first formed as described above and an oil-in-water emulsion follows upon phase inversion. In this case, an oil-in-water emulsion, which has an average particle size and a particle size distribution depending on the amount of water or water and emulsifying agent and the agitation intensity for emulsification, is formed. The water-soluble binder is then added to the abovedescribed oil-in-water emulsion and dissolved therein by mixing. When the stirring is continued, an oil-in-water emulsion which has an average particle size and a distribution of particle size depending on the amount of the water-soluble binder and the degree of agitation used for emulsification is formed. Thereafter, it is possible to add additional water or water and the emulsifying agent. Still, the water or the water and the emulsifying agent and the water-soluble binder may be added separately and the amount of water or water and emulsifying agent may be modified.

Representative organic solvents which can be used to dissolve or reduce the viscosity of the hydrophobic material are phthalic acid alkyl esters (dibutyl phthalate and dioctyl phthalate, etc.), phosphoric acid esters (diphenyl phosphate, triphenyl phosphate, tricresyl phosphate and dioctylbutyl phosphate), citric acid esters (for example, tributyl acetylcitrate), benzoic acid esters (for example, octyl benzoate), alkylamides (for example, diethyllaurylamide) and aliphatic acid esters (for example, dibutoxylethyl succinate and dioctyl azelate), etc. Further, organic solvents having a boiling point of about 30° C. to 160° C. such as lower alkyl acetates such as ethyl acetate, butyl acetate, etc., ethyl propionate, secondary butyl alcohol, methyl isobutyl ketone, cyclohexanone, β-ethoxyethyl acetate and methyl cellosolve acetate, etc., can be used in combination with those above which have higher boiling points.

Other suitable solvents are described in U.S. Pat. Nos. 2,322,027, 2,533,514 and 2,835,579, Japanese Patent Publication No. 23233/71, U.S. Pat. No. 3,287,134, British Pat. No. 958,441, Japanese patent application (OPI) No. 1031/72 (the term "OPI" as used herein refers to a "published unexamined Japanese patent application"), British Pat. No. 1,222,753, U.S. Pat. No. 3,936,303, Japanese patent application (OPI) Nos. 26037/76 and 82078/75, U.S. Pat. Nos. 2,353,262, 2,852,383, 3,554,755, 3,676,137, 3,676,142, 3,700,454, 3,748,141 and 3,837,863, German patent application (OLS) No. 2,538,889, Japanese patent application (OPI) Nos. 27921/76, 27922/76, 26035/76, 26036/76 and 62632/75, Japanese Patent Publication No. 29461/74, U.S. Pat. No. 3,936,303 and Japanese patent application (OPI) No. 1521/78.

Turning to the water-soluble binder, in photographic sensitive materials proteins such as gelatin, gelatin derivatives, graft polymers of gelatin and other high molecular weight materials, albumin or casein, etc.; saccharides such as cellulose derivatives like hydroxyethyl cellulose, carboxymethyl cellulose or cellulose sulfates, etc., sodium alginate or starch derivatives, etc.; many synthetic hydrophilic high molecular substances such as homo- or copolymers of polyvinyl alcohol, polyvinyl alcohol semiacetal, poly-N-vinylpyrrolidone, polyacrylic acid, polymethacrylic acid, polyacrylamide, polyvinylimidazole or polyvinylpyrazole, etc., are suitable.

The gelatin can be not only lime treated gelatin but also acid treated gelatin and enzyme treated gelatin as described in *Bull. Soc. Sci. Phot. Japan,* No. 16, p. 30 (1966). Further, hydrolysis products and enzymatic decomposition products of gelatin can also be used. As the gelatin derivatives, it is possible to use substances produced by reacting gelatin with various compounds such as acid halides, acid anhydrides, isocyanates, bromoacetic acid, alkanesulfones, vinyl sulfonamides, maleinimides, polyalkylene oxides or epoxy compounds, etc. Examples of suitable gelatin derivatives are described in U.S. Pat. Nos. 2,614,928, 3,132,945, 3,186,846 and 3,312,553, British Pat. Nos. 861,414, 1,033,189 and 1,005,784 and Japanese Patent Publication No. 26845/67, etc.

The above-described graft polymers of gelatin may be substances grafted with homo- or copolymers of vinyl monomers such as acrylic acid, methacrylic acid, esters and amide derivatives thereof, acrylonitrile or styrene, etc. Particularly, it is preferred to use graft polymers grafted with polymers having some degree of compatibility with gelatin, for example, polymers of acrylic acid, methacrylic acid, acrylamide, methacrylamide or hydroxyalkyl methacrylate, etc. Gelatins grafted with polymers are described in U.S. Pat. Nos. 2,763,625, 2,831,767 and 2,956,884.

Typical synthetic hydrophilic high molecular materials are described in German patent application (OLS) No. 2,312,708, U.S. Pat. Nos. 3,620,751 and 3,879,205 and Japanese Patent Publication No. 7561/68.

Emulsifying agents which are suitable for use in photosensitive materials are nonionic surface active agents such as saponin, alkylene oxide derivatives (for example, polyethylene glycol, polyethylene glycol/polypropylene glycol condensate, polyethylene glycol alkyl ether, polyethylene glycol alkylaryl ether, polyethylene glycol esters, polyethylene glycol sorbitan esters, polyalkylene glycol alkylamine or amides, and polyethylene oxide addition products of silicone, etc.), glycidol derivatives (for example, alkenylsuccinic acid polyglyceride and alkyl phenol polyglyceride), aliphatic acid esters of polyhydric alcohols, alkyl esters of saccharides, urethanes of sacchardies or ethers of saccharides, etc.; anionic surface active agents having acid groups such as a carboxyl group, a sulfo group, a phospho group, a sulfuric acid ester group or a phosphoric acid ester group, such as triterpenoid type saponin, alkyl carboxylic acid salts, alkylsulfonic acid salts, alkylbenzenesulfonic acid salts, alkylnaphthalenesulfonic acid salts, alkylsulfuric acid esters, alkylphosphoric acid esters, N-acyl-N-alkyltaurines, sulfosuccinic acid esters, sulfoalkyl polyoxyethylene alkylphenyl ethers or polyoxyethylene alkylphosphoric acid esters, etc.; ampholytic surface active agents such as amino acids, aminoalkylsulfonic acids, aminoalkylsulfuric acid esters, aminoalkylphosphoric acid esters, alkylbetaines, amineimides or amineoxides, etc.; and cationic surface active agents such as alkylamine salts, aliphatic or aromatic quaternary ammonium salts, heterocyclic quaternary ammonium salts such as pyridinium or imidazolium salts, and phosphonium or sulfonium salts containing an aliphatic group or heterocyclic group, etc.

Examples of these surface active agents are described in U.S. Pat. Nos. 2,240,472, 2,831,766, 3,158,484, 3,210,191, 3,294,540 and 3,507,660, British Pat. Nos. 1,012,495, 1,022,878, 1,179,290 and 1,198,450, Japanese patent application (OPI) No. 117414/75, U.S. Pat. Nos. 2,739,891, 2,823,123, 3,068,101, 3,415,649, 3,666,478 and 3,756,828, British Pat No. 1,397,218, U.S. Pat. Nos. 3,133,816, 3,441,413, 3,475,174, 3,545,974, 3,726,683 and 3,843,368, Belgian Pat. No. 731,126, British Pat. Nos. 1,138,514, 1,159,825 and 1,374,780, Japanese Patent Publication Nos. 378/65, 379/65 and 13822/68, U.S. Pat. Nos. 2,271,623, 2,288,226, 2,944,900, 3,253,919, 3,671,247, 3,772,021, 3,589,906, 3,666,478 and 3,754,924, German patent application (OLS) No. 1,961,638 and Japanese patent application (OPI) No. 59025/75.

The emulsion obtained by the process of the present invention is remarkably stable and is subject to little change in particle size with time. Moreover, the hydrophobic material in the oil drops of the oily phase solution remains fairly uniformly dispersed during emulsification.

The above-described process of the present invention has the following advantages.

(1) Emulsions obtained by the process of the present invention are very stable and subject to little change in particle size with time as compared with emulsions obtained by other processes, and the hydrophobic material in the drops of the oily phase solution does not separate during emulsification.

(2) It is possible to obtain desired emulsions which do not contain large particles and have a narrow particle size distribution by adding a water-soluble binder after phase inversion of the water-in-oil emulsion to an oil-in-water emulsion during the emulsification step by means of the high speed dispersing means to form an oil-in-water emulsion having a narrow distribution of particle size.

(3) It is possible to control the average particle size of the emulsions by appropriately selecting the addition time and amount of water or water and emulsifying agent in the aqueous phase and the water-soluble binder without modifying the formulation of the emulsion or the operating conditions for the dispersing machine.

(4) Since the preparation of the oil-in-water emulsion can be carried out in the same tank 30 as used for preparing the solution of the hydrophobic material, the solution of the hydrophobic material which is terribly difficult to remove by washing also becomes an oil-in-water emulsion which is easily removed from the tank 30 and, consequently, much time is not required for cleaning the apparatus.

(5) Further, because preparation of the solution of the hydrophobic material and preparation of the desired emulsion can be carried out in the same tank 30, it becomes possible to obtain effectively the desired emulsions by means of an inexpensive simple compact apparatus as compared with conventional processes, and the loss of hydrophobic material becomes remarkably small. Further, much time is not required for adjustment of the apparatus.

The process of the present invention has been illustrated in detail with reference to a coupler emulsion. Though the process of the present invention is particularly advantageous in case of preparing emulsions for photographic sensitive materials such as a coupler emulsion, it will be apparent to those skilled in the art that its application is not limited to preparation of the emulsions for photographic sensitive materials. Various hydrophobic materials which can be formed into oil-in-water emulsions in accordance with the present invention are now discussed in more detail.

Couplers are dye image-forming compounds which form a dye by reacting with an oxidation product of color developing agents, for example, aromatic amines (generally, primary amines). It is generally preferred that the couplers are non-diffusible having a hydrophobic group called a ballast group in the molecule. They may be 4-equivalent or 2-equivalent with respect to a silver ion. The couplers may be colored couplers having a color correction effect and the so-called DIR couplers which release a development inhibitor upon development as well as conventionally recognized cyan, magenta, and yellow couplers. It is also possible to disperse colored couplers.

Two or more of the above-described couplers may be incorporated in the same photographic layer and dispersed together. Generally, the couplers are added in an amount of about $2\times10^{-3}$ to $5\times10^{-1}$ mol and preferably $1\times10^{-2}$ to $5\times10^{-1}$ mol per mol of silver in the emulsion coating.

The compounds used in diffusion transfer processes include dye developing agents, diffusible dye releasing couplers (DDR coupler) and diffusible dye releasing redox compounds (DRR compound). The dye developing agents are compounds having a dye moiety and a silver halide developer moiety in the molecule such as described in U.S. Pat. No. 2,983,606. When the dye developing agent is reacted with an exposed silver halide emulsion in the presence of an alkali, reduction of the silver halide and oxidation of the dye developing agent occur. The oxidized dye developing agent has a low solubility and a low diffusibility in the processing composition as compared with the unoxidized dye developing agent, by which it is fixed near the reduced silver halide. In a preferred form, the dye developing agents are substantially insoluble in acid or neutral aqueous mediums, but contain at least one residue which can be released to render the dye developing agent soluble and diffusible in the alkaline environment of the processing compositions. These dye developing agents can be incorporated in photosensitive elements and, particularly, in silver halide emulsion layers or layers adjacent to them. Multicolor positive images are obtained by one development processing, if diffusion transfer is carried out on an image receiving element using a photosensitive element having two or more sensitive units which comprise combinations of silver halide emulsions and dye developing agents having absorption characteristics corresponding to the photosensitive wavelength range of the silver halide. The dye developing agents advantageously have light absorption characteristics by which it becomes possible to carry out color reproduction by a subtractive process, namely, to give yellow, magenta and cyan images.

The dye moieties which provide the absorption characteristics are derived from azo dyes, anthraquinone dyes, phthalocyanine dyes, nitro dyes, quinoline dyes, azomethane dyes, indamine dyes, indoaniline dyes, indophenol dyes and azine dyes, etc. On the other hand, the silver halide developer moiety is a group capable of developing exposed silver halide and, particularly, a group which loses its hydrophilic property upon oxidation. Generally, a benzenoid developer moiety, namely, an aromatic developer moiety which produces a quinoid by oxidation is preferred. A preferred example of the developer moiety is a hydroquinonyl group and other examples of suitable dye developer moiety include an orthodihydroxyphenyl group and o- and p-amino substituted hydroxyphenyl groups. In preferred dye developing agents, the dye moiety and the developer moiety are interrupted by a saturated aliphatic group such as an ethylene group so as to prevent an electronically conjugated state. Particularly, a 2-hydroquinonylethyl group and a 2-hydroquinonylpropyl group are preferred. The dye moiety and the developer moiety may be linked not only by a covalent bond but also by a coordinate bond as described in U.S. Pat. Nos. 3,551,406, 3,563,739, 3,597,200 and 3,674,478.

In the diffusion transfer color photography using the dye developing agents as dye image donators, it is advantageous to use an auxiliary developing agent. For such a purpose, developing agents described in U.S. Pat. No. 3,039,869 such as 1-phenyl-3-pyrazolidone, hydroquinone derivatives such as 4′-methylphenylhydroquinone or t-butylhydroquinone, or catechol derivatives described in U.S. Pat. No. 3,617,277 may be added to liquid processing compositions or added to photosensitive elements such as silver halide emulsion layers, dye developing agent-containing layers, intermediate layers or a protective layer. Further, in order to accelerate development and diffusion transfer, processing may be carried out in the presence of onium compounds such as N-benzyl-α-picolinium bromide described in U.S. Pat. No. 3,173,786. All of these materials can be dispersed in accordance with the present invention.

The diffusible dye releasing couplers are reactive non-diffusible compounds capable of coupling with an oxidized developing agent, by which a dye soluble and diffusible in processing solutions can be released upon coupling reaction. One type of diffusible dye releasing coupler has a coupling reactive position substituted by a residue capable of releasing an oxidized developing agent. The conjugated system of the discharged dye may be previously incorporated in the couplers or may be formed by the coupling reaction. The former is referred to as a "preformed" coupler in which the coupler shows spectral absorptions near those of the discharged dye. On the other hand, the latter is referred to as a "non-preformed" coupler in which the coupler is colorless or has no direct relation to the absorption of the discharged dye if it is colored.

As the aromatic primary amine developing agents used in combination with the diffusible dye releasing couplers, p-aminophenol, p-phenylenediamine and derivatives thereof are advantageously used. Particularly, it is preferred to use 2-chloro-4-aminophenol, 2,6-dibromo-4-aminophenol, 4-amino-N,N-diethyl-3-methylaniline, N,N-diethyl-p-phenylenediamine, N-ethyl-β-methanesulfonamidoethyl-3-methyl-4-aminoaniline, 4-amino-N-ethyl-N-(β-sulfobutyl)aniline, 4-amino-N-ethyl-N-(β-hydroxyethyl)aniline, 4-amino-3-methyl-N-ethyl-N-(β-hydroxyethyl)aniline, 4-amino-N-ethyl-N-(β-carboxyethyl)aniline, 4-amino-N,N-bis(β-hydroxyethyl)-3-methylaniline, 3-acetamido-4-amino-N,N-(β-hydroxyethyl)aniline, 4-amino-N-ethyl-N-(2,3-dihydroxypropyl)-3-methylaniline, 4-amino-N,N-diethyl-3-(3-hydroxypropoxy)aniline, 4-amino-N-ethyl-N-(β-hydroxyethyl)-3-methoxyaniline and salts of these anilines such as hydrochloride, sulfate, oxalate and p-toluenesulfonate thereof. Further, precursors of the developing agent such as Schiff bases of these anilines or phthalic acid imides are useful, because they can be added to the photosensitive elements.

Negative silver halide emulsion layers containing diffusible dye releasing couplers yield negative diffusion transfer dye images upon development processing. On the contrary, direct positive silver halide emulsion layers containing diffusible dye releasing couplers yield positive diffusion transfer dye images. As the direct positive emulsions, it is preferred to use inner latent image type emulsions such as described in U.S. Pat. Nos. 2,592,250, 2,588,982 and 3,227,552 and fogged emulsions described in British Pat. Nos. 444,245 and 462,730 and U.S. Pat. Nos. 2,005,837, 2,541,472 and 3,367,778. When a layer containing the diffusible dye releasing couplers and physical development nuclei is provided adjacent a negative type silver halide emulsion layer and processed with a developing solution containing a solvent for the silver halide, positive diffusion transfer dye images are obtained. As a reversal dye image forming technique utilizing such physical development, that described in British Pat. No. 904,364 can be utilized. Further, in a photosensitive element comprising a layer containing the diffusible dye releasing couplers and spontaneously reducible metal salts which is provided so as to be adjacent to a negative silver halide emulsion layer containing a compound which releases a developing agent such as 1-phenyl-5-mercaptotetrazole by reacting with an oxidized product of the developing agent (DIR compound), positive diffusion transfer dye images are obtained as shown in U.S. Pat. Nos. 3,227,551, 3,227,554 and 3,364,022 and German Patent Application (OLS) No. 2,032,711. In the present invention, combinations of these emulsions and the dye image donators may be used, by which it is possible to select a process for forming negative dye images or a process for forming positive dye images depending on the purpose.

In the present invention, it is possible to advantageously use a diffusible dye releasing redox compound, namely dye image donators which release a diffusible dye by an intramolecular reaction of an oxidized reducing agent produced upon development or by reaction with an auxiliary agent in the solution in addition to the above-described dye developing agents and diffusible dye releasing couplers. In dye image formation of this type, it is preferred to oxidize the dye image donators through an auxiliary developing agent such as hydroquinones or 3-pyrazolidones. The oxidized dye image donators release diffusible dyes by the function of a supplementary agent such as hydroxy ions or sulfite ions in the processing composition or the photosensitive element. Examples of dye image forming agents of this type have been described in U.S. Pat. Nos. 3,585,026 and 3,698,897 and German Patent Application (OLS) No. 2,242,762.

DRR compounds are described in Japanese Patent Application (OPI) Nos. 33826/73, 114424/74, 126331/74, 126332/74 and 115528/75, U.S. Pat. Nos. 3,931,144 and 3,954,476 and *Research Disclosure,* 13024 (1975) and compounds described in U.S. Patent Publication 351,673, U.S. Pat. No. 3,928,312, French Pat. No. 2,284,140, British Pat. No. 1,405,662, Japanese patent applicaton (OPI) Nos. 104344/76, 118723/75 and 113624/76, Japanese Patent Application Nos. 78057/76 and 125857/76 and U.S. Pat. Nos. 3,725,062, 3,698,897 and 3,728,113.

Anti-color-fogging agents include hydroquinone derivatives, aminophenol derivatives, gallic acid derivatives and ascorbic acid derivatives. Examples of them have been described in U.S. Pat. Nos. 2,360,290, 2,336,327, 2,403,721, 2,418,613, 2,675,314, 2,701,197, 2,704,713, 2,728,659, 2,732,300 and 2,735,765, Japanese Patent Application (OPI) Nos. 92988/75, 92989/75, 93928/75, 110337/75 and 146235/77 and Japanese Patent Publication No. 23813/75.

Antifading agents include hydroquinone derivatives described in U.S. Pat. Nos. 2,360,290, 2,418,613, 2,675,314, 2,701,197, 2,704,713, 2,728,659, 2,732,300, 2,735,765, 2,710,801 and 2,816,028 and British Pat. No. 1,363,921, etc., gallic acid derivatives described in U.S. Pat. Nos. 3,457,079 and 3,069,262, etc., p-alkoxyphenols described in U.S. Pat. Nos. 2,735,765 and 3,698,909 and Japanese Patent Publication Nos. 20977/74 and 6623/77, etc., p-oxyphenol derivatives described in U.S. Pat. Nos. 3,432,300, 3,573,050, 3,574,627 and 3,764,337 and Japanese Patent Application (OPI) Nos. 35633/77, 147434/77 and 152225/77, etc., and bisphenols described in U.S. Pat. No. 3,700,455, etc.

As antistaining agents there are, for example, dihydroxybenzene derivatives described in U.S. Pat. Nos. 2,336,327, 2,360,290, 2,403,721, 3,700,453 and 2,701,197, Japanese Patent Application (OPI) No. 2128/71 and Japanese Patent Application Nos. 95256/77 and 84321/76, etc., dihydroxynaphthalene derivatives, aminonaphthol derivatives, sulfonamidophenol derivatives and sulfonamidonaphthol derivatives, etc.

As ultraviolet ray absorbing agent, it is possible to use benzotriazole compounds substituted by an aryl group (for example, those described in U.S. Pat. No. 3,533,794), 4-thiazolidone compounds (for example, those described in U.S. Pat. Nos. 3,314,794 and 3,352,681), benzophenone compounds (for example, those described in Japanese Patent Application (OPI) No. 2784/71), cinnamic acid esters (for example, those described in U.S. Pat. Nos. 3,705,805 and 3,707,375), butadiene compounds (for example, those described in U.S. Pat. No. 4,045,229) and benzoxazole compounds (for example, those described in U.S. Pat. No. 3,700,455). In addition, it is possible to use compounds described in U.S. Pat. No. 3,499,762, too. Ultraviolet ray absorbing couplers (for example, α-naphthol type cyan forming couplers) and ultraviolet ray absorbing polymers may be used, too. These ultraviolet ray absorbing agents may be mordanted in a specific layer.

Whitening agents include stilbene compounds, triazine compounds, oxazole compounds and coumarin compounds. Examples of them have been described in U.S. Pat. Nos. 2,632,701, 3,269,840 and 3,359,102 and British Pat. Nos. 852,075 and 1,319,763.

The process of the present invention as described above is explained in greater detail with reference to following examples and comparative examples.

EXAMPLE 1

In a dissolving-emulsifying tank 30 shown in FIG. 3, 20 g of 2,4-dichloro-3-methyl-6-[α-(2,4-di-t-amylphenoxy)butyramide]phenol, a cyan forming coupler, 10 cc of tricresyl phosphate and 30 cc of ethyl acetate were heated to 60° C. to produce an oily phase coupler solution. The resulting oily phase solution was stirred for 5 minutes at 1,000 rpm by the above-described dispersing means 31 while adding 80 cc of water and 1 g of sodium dodecylbenzenesulfonate thereto. Then, an aqueous solution of gelatin composed of 24 g of gelatin powder and 96 cc of water was added and the mixture was stirred for 15 minutes at 1,000 rpm by the above-described dispersing means 31 and stirred thereafter for 30 minutes at 3,000 rpm to produce an oil-in-water emulsion.

The average particle size of this oil-in-water emulsion was 0.27μ and the particle size distribution was 0.05 to 0.6μ. When this emulsion was stored for 1 month at 5° C., no change of the particle size was observed.

EXAMPLE 2

Using the same apparatus as in Example 1, an oily phase coupler solution having the same composition as in Example 1 but containing 1 g of sorbitan monolaurate (Span 20, manufactured by Atlas Powder Co., (U.S.A.)) was stirred for 5 minutes at 1,000 rpm by the above-described dispersing means 31 while adding 133 cc of water and 1 g of sodium dodecylbenzenesulfonate thereto. 24 g of a gelatin powder was added thereto. After the mixture was stirred for 15 minutes at 1,000 rpm by the above-described dispersing means 31 to dissolve the gelatin, it was stirred for 30 minutes at 3,000 rpm to produce an oil-in-water emulsion. Then, 43 cc of water was added thereto and the mixture was stirred at 500 rpm for 1 minute by the above-described dispersing means 31.

The average particle size of this oil-in-water emulsion was 0.22μ and the distribution was 0.05 to 0.5μ. When this emulsion was stored for 1 month at 5° C., no change in the particle size was observed.

EXAMPLE 3

Using the same apparatus as in Example 1, an oily phase solution having the same composition as in Example 1 was stirred for 5 minutes at 1,000 rpm by the above-described dispersing means 31 while adding 109 cc of water and 1 g of sodium dodecylbenzenesulfonate. 24 g of a gelatin powder was then added thereto. After the mixture was stirred for 15 minutes at 1,000 rpm by the above-described dispersing means 31 to dissolve gelatin, it was stirred for 30 minutes at 3,000 rpm to produce an oil-in-water emulsion. 67 cc of water was then added thereto and the mixture was stirred for 1 minute at 500 rpm by the above-described dispersing means 31.

The average particle size of this oil-in-water emulsion was 0.2μ and the distribution was 0.05 to 0.4μ. When this emulsion was stored for 1 month at 5° C., a change of the particle size was not observed.

COMPARISON EXAMPLE 1

For the purpose of comparison, the first tank 1, the second tank 2 and the emulsifying machine as shown in FIG. 1 (A) were used. 20 g of 2,4-dichloro-3-methyl-6-[α-(2,4-di-t-amylphenoxy)butyramide]phenol as a cyan forming coupler, 10 cc of tricresyl phosphate and 30 cc of ethyl acetate were heated to 60° C. in the first tank 1 to produce an oily phase coupler solution, while 133 cc of water, 1 g of sodium dodecylbenzenesulfonate and 24 g of gelatin were added at 60° C. in the second tank 2 to produce an aqueous solution comprising gelatin and the emulsifying agent. This aqueous solution was stirred at 300 rpm by the propeller stirrer 4 while adding the above-described coupler solution thereto to carry out emulsification. Further, emulsification was carried out by passing the emulsion through the above-described emulsifying machine 5 (homogenizer) twice under 420 $kg/cm^2$ of the pressure to produce an oil-in-water emulsion. The average particle size of this emulsion was 0.23μ and the distribution was 0.05 to 3μ. When this emulsion was stored for 1 month at 5° C., the average particle size increased to 0.4μ.

EXAMPLE 4

Using the same apparatus as in Example 1, 20 g of the yellow dye: 3-cyano-4-[3-(5-hexadecyloxy-2-hydroxy-4-methylphenylsulfamoyl)-4-(2-methoxyethoxy)-phenylhydrazono]-1-phenyl-5-pyrazolone as a diffusion transfer compound, 4 cc of N,N-diethyllaurylamide and 60 cc of ethyl acetate were added at 60° C. to produce an oily phase dye solution. This oily phase solution was stirred for 1 minute at 1,000 rpm by the above described dispersing means 31 while adding 140 cc of water and 1 g of sodium dodecylbenzenesulfonate. 25 g of a gelatin powder was then added thereto. After the mixture was stirred at 1,000 rpm for 15 minutes to dissolve the gelatin, it was stirred for 10 minutes at 3,000 rpm by the above-described dispersing means 31 to produce an oil-in-water emulsion.

The average particle size of this oil-in-water emulsion was 0.15μ and the distribution thereof 0.05 to 0.25μ. In this emulsion, crystals of the above-described dye were not observed.

Similarly, good emulsions were obtained by the process of the present invention using other yellow dyes: 3-cyano-4-{5-[3-(2-hydroxy-4-methyl-5-hexadecyloxyphenyl-sulfamoyl)phenylsulfamoyl]-2-methoxyphenylazo}-1-phenyl-5-pyrazolone and 3-cyano-4-{5-[5-(5-hexadecyloxy-2-hydroxy-4-methoxyphenylsulfamoyl)-4-(2-methoxyethoxy)phenyl-sulfamoyl]-2-methoxyphenylazo}-1-phenyl-5-pyrazolone.

COMPARISON EXAMPLE 2

For the purpose of comparison, the first tank 1, the second tank 2 and the emulsifying machine 5 as shown in FIG. 1 (A) were used. 20 g of 3-cyano-4-[3-(5-hexadecyloxy-2-hydroxy-4-methylphenylsulfamoyl)-4-(2-methoxyethoxy)phenylhydrazono]-1-phenyl-5-pyrazolone as a yellow dye, 4 cc of N,N-diethyllaurylamide and 60 cc of ethyl acetate were heated to 60° C. in the first tank 1 to produce an oily phase dye solution, while 140 cc of water, 1 g of sodium dodecylbenzenesulfonate and 25 g of gelatin were heated to 60° C. in the second tank 2 to produce an aqueous solution comprising gelatin and the emulsifying agent. This aqueous solution was stirred at 300 rpm by the propeller stirrer 4 with adding the above-described dye solution thereto to carry out emulsification. Further, emulsification was carried out by passing the emulsion through the emulsifying machine 5 (homogenizer) twice under 420 $kg/cm^2$ to produce an oil-in-water emulsion.

The average particle size of this emulsion was 0.17μ and the distribution was 0.05 to 1μ. Further, fine crystals of the dye were observed in the above-described emulsion just after emulsification.

EXAMPLE 5

Using the same apparatus as in Example 1, 20 g of 2,5-di-t-pentadecylhydroquinone as an anti-color-fogging agent, an antifading agent or an antistaining agent was heated to 60° C. to produce an oily phase solution. This oily phase solution was stirred for 5 minutes at 1,000 rpm by the above-described dispersing means 31 while adding 180 cc of water and 2 g of sodium dodecylbenzenesulfonate. Then, 40 g of a gelatin powder was added thereto. After the mixture was stirred for 15 minutes at 1,000 rpm to dissolve the gelatin, it was stirred for 30 minutes at 3,000 rpm by the dispersing means 31 to produce an oil-in-water emulsion.

The average particle size of this oil-in-water emulsion was 0.22μ and the distribution thereof was 0.05 to 0.4μ.

COMPARISON EXAMPLE 3

For comparison with Example 5, the first tank 1, the second tank 2 and the emulsifying machine 5 as shown in FIG. 1 (A) were used. 20 g of 2,5-di-t-pentadecylhydroquinone as an anti-color-fogging agent, an antifading agent or an antistaining agent was heated to 68° C. in the first tank 1 to produce an oily solution, while 180 cc of water, 2 g of sodium dodecylbenzenesulfonate and 40 g of gelatin were heated to 60° C. in the second tank 2 to produce an aqueous solution comprising gelatin and the emulsifying agent. This aqueous solution was stirred at 300 rpm by the propeller stirrer 4 while adding the above-described oily phase solution thereto to carry out emulsification. Further, emulsification was carried out by twice passing the emulsion through the emulsifying machine 5 (homogenizer) under 420 $kg/cm^2$ of the pressure to produce an oil-in-water emulsion.

The average particle size of this emulsion was 0.7μ and the distribution was 0.05 to 3μ.

EXAMPLE 6

Using the same apparatus as in Example 1, 15 g of 2-ethylhexyl-2-cyano-3-(3,4-ethylenedioxyphenyl)acrylate as an ultraviolet ray absorbing agent, 20 cc of tricresyl phosphate, 2 g of Aerosol OT (produced by American Cyanamid Co.) and 20 cc of ethyl acetate were heated to 60° C. to produce an oily phase solution. This oily phase solution was then stirred for 5 minutes at 1,000 rpm by the above-described dispersing means 31 while adding 160 cc of water thereto. Then, 24 g of a gelatin powder was added thereto. After stirring for 15 minutes at 1,000 rpm by the dispersing means 31 to dissolve the gelatin, the mixture was stirred for 30 minutes at 3,000 rpm to produce an oil-in-water emulsion.

The average particle size of this oil-in-water emulsion was 0.23μ and the distribution was 0.05 to 0.7μ.

COMPARISON EXAMPLE 4

For the purpose of comparison with Example 6, the first tank 1, the second tank 2 and the emulsifying machine 5 as shown in FIG. 1 (A) were used. 15 g of 2-ethylhexyl-2-cyano-3-(3,4-ethylenedioxyphenyl)acrylate as an ultraviolet ray absorbing agent, 20 cc of tricresyl phosphate, 2 g of Aerosol OT (produced by American Cyanamid Co.) and 20 cc of ethyl acetate were heated to 60° C. in the first tank 1 to produce an oily phase solution, while 160 cc of water and 24 g of gelatin were heated to 60° C. in the second tank 2 to produce an aqueous solution of gelatin. This aqueous solution was stirred at 300 rpm by the propeller stirrer 4 while adding the above-described oily phase solution thereto to carry out emulsification. Further, emulsification was carried out by twice passing the emulsion through the emulsifying machine 5 (homogenizer) under 420 $kg/cm^2$ of the pressure to produce an oil-in-water emulsion.

The average particle size of this emulsion was 0.23μ and the distribution was 0.05 to 3μ.

While the invention has been described in detail and with reference to specific embodiments thereof, it will be apparent to one skilled in the art that various changes and modifications can be made therein without departing from the spirit and scope thereof.

We claim:

1. A process for emulsification which comprises producing an oily phase solution of a hydrophobic material in a dissolving-emulsifying tank equipped with a high speed dispersing means by stirring the hydrophobic material directly or dissolving the hydrophobic material or a hydrophobic material and an emulsifying agent in an organic solvent with heating, forming a water-in-oil emulsion of said hydrophobic material by adding water or water and an emulsifying agent to said solution of the hydrophobic material with stirring, continuing the addition of water or water and the emulsifying agent to form an oil-in-water emulsion by phase inversion, adding a water-soluble binder to said oil-in-water emulsion and stirring the emulsion to form the desired oil-in-water emulsion, said hydrophobic material remaining in an emulsified form, whereby substantially all of said hydrophobic material is precluded from precipitating.

2. The process of claim 1, wherein said hydrophobic material is selected from the group consisting of a dye image forming compound, a diffusion transfer compound, an anti-color-fogging agent, an antifading agent, an antistain agent, an ultraviolet ray absorbing agent and a whitening agent used in photographic sensitive materials.

3. The process of claim 1, wherein said water-soluble binder is gelatin.

4. The process of claim 1, wherein said stirring is at a rate of at least 500 rpm.

5. The process of claim 1, wherein said dispersing means is a dissolver, a homomixer, a homoblender or a Kady mill.

* * * * *